March 16, 1971      H. B. HARLAN ET AL      3,570,109
JOINING METHOD AND APPARATUS THEREFOR Filed June 24, 1968      2 Sheets-Sheet 1

INVENTOR
HUBERT B. HARLAN
PAUL W. TURNER
BY *Paul E. Hodges*
    *attorney*

March 16, 1971 H. B. HARLAN ET AL 3,570,109
JOINING METHOD AND APPARATUS THEREFOR
Filed June 24, 1968 2 Sheets-Sheet 2

INVENTOR
HUBERT B. HARLAN
PAUL W. TURNER
BY Paul E. Hodges
attorney

United States Patent Office 3,570,109
Patented Mar. 16, 1971

3,570,109
JOINING METHOD AND APPARATUS THEREFOR
Hubert B. Harlan, 230 S. Purdue Ave., and Paul W. Turner, 108 Poplar Road, both of Oak Ridge, Tenn. 37830
Filed June 24, 1968, Ser. No. 740,832
Int. Cl. B23k 5/22, 31/02
U.S. Cl. 29—491                                 5 Claims

ABSTRACT OF THE DISCLOSURE

An improved method for joining abutting surfaces of adjacent materials wherein a dam member is placed on the backside of the abutting surfaces to define, in combination with the abutting surfaces, a space to be filled with fluid joining matter, a negative pressure, relative to the ambient pressure on the front (torch) side of the weld, being provided on the back side of the abutting members to force complete filling of at least a part of the area defined by the dam and abutting members. The method is particularly useful in joining large diameter pipe.

BACKGROUND OF THE INVENTION

(a) Field of the invention

This invention relates to methods and apparatus for joining abutting surfaces of adjacent materials, particularly fusion welding of abutting pipeline ends as is discussed hereinafter for purposes of illustration.

The present invention directs itself to the general problems of (1) controlling and/or restricting the flow of molten weld metal and (2) developing a desirable weld bead. It will be immediately apparent that these two problems are basic to a very great variety of welding operations. For example, the problems are present when joining the ends of two flat plates, when joining pipe ends such as the steam pipes in an electric power plant, or when joining the ends of pipeline being laid across the Rocky Mountains. In the interest of simplifying the discussion herein, attention will be concentrated on the welding of the abutting ends of the pipe of a pipeline. Not uncommonly such pipe will have a diameter of about 40 inches. Where appropriate, however, an occasional reference will be made hereinafter to examples of joining other than pipeline welding.

(b) Description of the prior art

Fusion welding necessarily involves flowable metal, or possibly in some instances a flowable substance other than metal. Control and restriction of the fluid-metal flow within the approximate area between the adjacent surfaces sought to be joined, is a primary problem of the art. The flowable metal may exist simultaneously throughout the joint as in brazing or it may be localized and advanced along the joint as in the gas metal-arc or other fusion welding process, the metal being fluidized ahead of the advancing torch and then solidifying behind the torch.

The prior art teaches that the presence of weld beads, protruding irregularly and/or excessively interiorly of pipeline which has been joined by welding, is often objectionable in that among other things, such beads produce deleterious effects with respect to the passing of fluid and/or mechanical devices through the pipe. Elimination of the protruding bead or, frequently, insuring a uniform, smooth contour of the bead, are means which the prior art teaches for eliminating the deleterious effects arising from improper contour of the bead. Associated with the problem of weld bead geometry control is the problem of incomplete penetration. Failure of the welder to effect complete fusion throughout the joint results, first of all, in loss of joint strength. Secondly, incomplete penetration gives rise to focal points of future trouble, such as corrosion, accumulation of solid matter (clogging), stress cracking and related destructive potentialities. In the prior art, operator skill is one of the primary factors determining whether a weld bead is created properly on the back and/or front side of a joint.

When fusion welding abutting pipe ends, for example pipe having a circular cross-section, a major deleterious force affecting proper and desirable metal flow is gravity. A large portion of the pipe joining operations are carried out with the longitudinal axis of pipe disposed in a horizontal position, thereby positioning the abutting pipe ends, hence the joint, in a vertical plane. It immediately becomes apparent that the effect of gravitational pull upon the flowable metal within the circular joint will be radically different along the circumferentially extending joint. In the instance of an advancing welding torch, the effect of gravity upon the weld puddle changes continually and cyclically along the circular joint. That is, at the top of the vertically-oriented, circular joint, gravitational forces tend to pull the weld metal into the pipe interior; at the bottom of the joint, these forces tend to cause the weld metal to fall away from the pipe; and, at points intermediate the top and bottom of the joint, these forces tend to force the weld metal to move tangentially with respect to the joint.

The consequence of uncontrolled gravity effects appears in the form of deleterious bead formations in the finished weld. The undersirable bead formations, such as "icicles," are well known in the art. Moreover, the difficulty in obtaining adequate control of the weld bead geometry is well-recognized.

In the last analysis, prior to the present invention, operator experience in making manual pipe-joining welds has proved to be the best mode for overcoming the gravitational effect. But even experienced welders, especially when welding pipe in fixed positions in the field, encounter difficulty as a consequence of such factors as, (1) wind currents disrupting the welding flame or arc, (2) viscosity, and, (3) changes in the amount of molten metal in the weld puddle resulting from inconsistent heat input to the puddle or from irregular advancement of the torch, and even such extraordinary and unpredictable forces as aspiration of the flowable metal into the pipeline due to wind blowing over that open end of the pipeline not being joined at the moment. Consequently, delicate and continual adjustments in welding conditions must be made in an effort to maintain control over the flow of the weld metal.

In addition, pipeline welds are most frequently required to comply with rigid specifications as regards the integrity of the weld. Inconsistency in obtaining sound welds is economically disastrous since transmission pipelines normally are welded in-situ, covered with earth, and later tested. Faulty welds require extensive search, reexcavation and repair activities. Such faulty welds frequently occur as a consequence of incomplete penetration or improper bead contour.

Additionally, when weld metal is in the molten state, its viscosity and surface tension are primary factors tending to hold the molten metal between the solid faces of the joint. The weld metal viscosity and surface tension are, in turn, a function of the heat input to the joint. A welder, by experience, in effect "learns" how to judge the quantity of molten metal and its viscosity by sight. Thus, an experienced welder manipulates the puddle of weld metal such that the molten metal flows properly in the joint. In pipeline welding by prior art techniques the welder must adjust the puddle of weld metal continually as the torch is progressed along the circular joint, for the gravitational force acts in conjunction with viscosity, surface tension, etc. additively at certain points along the joint and in opposition to said forces at other points. The result is poor welds and/or excessive costs.

In general, the inadequacy of the art is evidenced by the frequent discovery of welds of questionable quality, for example, the oft-heard request for improved pipeline wells, and the well-recognized existence of current research in welding.

It is an object of the present invention to overcome the prior art inadequacies and provide a method and apparatus by means of which sound, dependable, and otherwise acceptable, welds can be made. It is also an object to provide an economical method and apparatus for making such welds.

In summary, in joining by means of fusion welding, it is of great importance that, (1) there be complete penetration of the weld, and (2) the weld bead size and contour (both root and face) be controlled appropriately. The present invention eliminates the concern of the welder as regards the weld bead size and contour by providing the means whereby the size and contour of the root ("stringer") weld bead are established mechanically aside from the influence of operator skill and in a manner which ensures full penetration of the weld.

SUMMARY OF THE INVENTION

According to the present invention, abutting faces of the materials to be joined, pipe ends for example, are backed by a dam member positioned on one side of the abutting faces (interiorly of the pipeline) in at least the region where fusion is occurring. Continuous gas flow, at selected flow rates and flowing between the abutting faces (radially inward from the exterior of the pipe, between the abutting pipe ends in the pipeline example), thence through appropriate passages in the dam, is employed to establish and maintain a "dynamic" negative pressure (less than the ambient pressure exteriorly of the pipe) in the space defined by the dam and the abutting surfaces. This relatively negative pressure, as a consequence of its dynamic nature arising from the flowing gas, extends its influence into the region between the abutting faces and "pulls" molten weld metal toward the dam whereupon the flowable metal solidifies in the space defined by the dam and the joint and within the joint itself thereby effecting fusion of the abutting faces.

DESCRIPTION OF THE INVENTION

Figure 1:
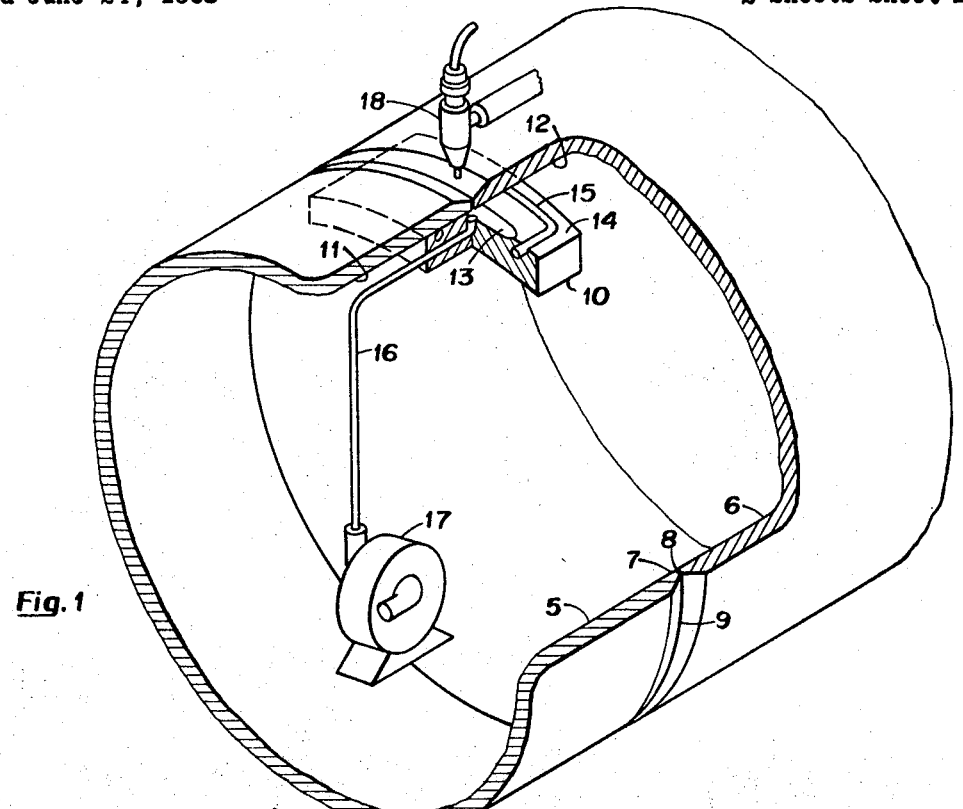
FIG. 1 is a schematic representation of two pipe sections, part in section, in position for being welded together, the joint being backed by a dam member.

Referring now to FIG. 1, one can visualize the present invention in its basic embodiment. Pipe sections 5 and 6 destined to be joined are axially aligned with their ends 7 and 8 in abutting relation. As depicted in FIG. 1, the longitudinal axes of the pipe sections aare horizontally aligned, hence the joint 9 is vertically oriented. Interiorly of the pipe section there is provided a dam member 10, arcuate in longitudinal cross-section in the present illustration, lying essentially against a portion of each interior surface 11 and 12 of the pipe sections. This dam member is centrally cavitated 13 along a major portion of its arcuate length on its most radially outward face 14. The perimeter of face 14 is fitted with a resilient seal 15 residing in a channel formed in the dam member. The chosen manner in which the dam member is disposed within the pipe section positions the elongated cavity 13 immediately adjacent to and in alignment with a portion of the abutting surfaces of pipe ends 7 and 8. Since the dam member lies essentially against the interior pipeline surfaces, seal 15 is pressed into sealing engagement with the pipe surfaces. It is now noted that a short portion of the circumferential joint (abutting surfaces) is effectively isolated, especially on the interior side thereof. Fluid flow between the abutting surfaces and in the immediate environs thereof can now be controlled.

The inventor further provides a conduit 16 leading from cavity 13 through dam member 10 to a suction pump 17. This pump can be positioned inside or outside the pipeline as best suits the operator. Further, in most instances the conduit 16 will be flexible. When pump 17 is turned "on," a negative pressure of preselected value obtains within cavity 13. This negative pressure is "dynamic," that is, there is a flow of atmospheric and/or shielding gases from outside the pipeline, through the isolated portion of the abutting surfaces, through the cavity, through the conduit, and finally through the pump.

Consequently, at least two functions are performed simultaneously by the aforedescribed ararngement; namely: (1) the pressure within cavity 13 is maintained less than the ambient pressure outside the pipeline, and (2) gases (usually shielding gases) are swept inwardly between the abutting pipe ends, through the cavity and on to the pump.

Most usually, the pipe ends are fused by a welding torch 18 positioned outside the pipe and moved along the joint by conventional mechanical or manual means (not shown). Essentially all welding of large diameter pipeline (about 42 inches diameter, for example) currently is accomplished by the gas-metal-arc process.

Through the use of the relatively negative pressure within the space defined by the dam and abutting pipe ends (or isolated portion thereof), the inventor provides a force whose resultant acts to pull flowable weld metal into cavity 13 and to completely fill the same plus at least a portion of the space between the abutting faces. On the first, "stringer" or root, pass of the torch along the joint, molten weld metal will fill the most radially inward portion of the defined space. This will include any cavity in the dam plus at least a portion of the space between the abutting pipe ends. The weld bead contour on its backslide and the degree of penetration are established during this first pass and subsequent passes for filling the joint are of no real consequence with respect to the present invention.

Through the use of this dam and negative pressure combination concept, the inventors provide a mechanical means, readily and selectively adjustable and controllable, whereby even an inexperienced welder can repeatedly produce sound welds which fully and adequately penetrate the joint. Likewise, the size and contour of the weld bead are established, as desired, substantially independently of the welder's inabilities and influence.

As regards the "dynamic" nature of the pressure within the defined space, by this concept the inventors provide the means wherein a welder of pipeline in the field can realize a large portion of the benefits obtainable through the use of controlled-atmosphere-welding. The shielding gas normally employed in torch welding is in part aspirated radially inward between the abutting surfaces to be welded, thereby sweeping the same free of foreign matter and bathing them with shielding gas during welding. Moreover, a minimum of equipment is necessary to establish the required gas flow through the defined space thereby rendering the concept amenable to the portability requirements of field welding. Welds produced in accordance with the present invention are oxide-free on both sides of the weld.

Figure 2:
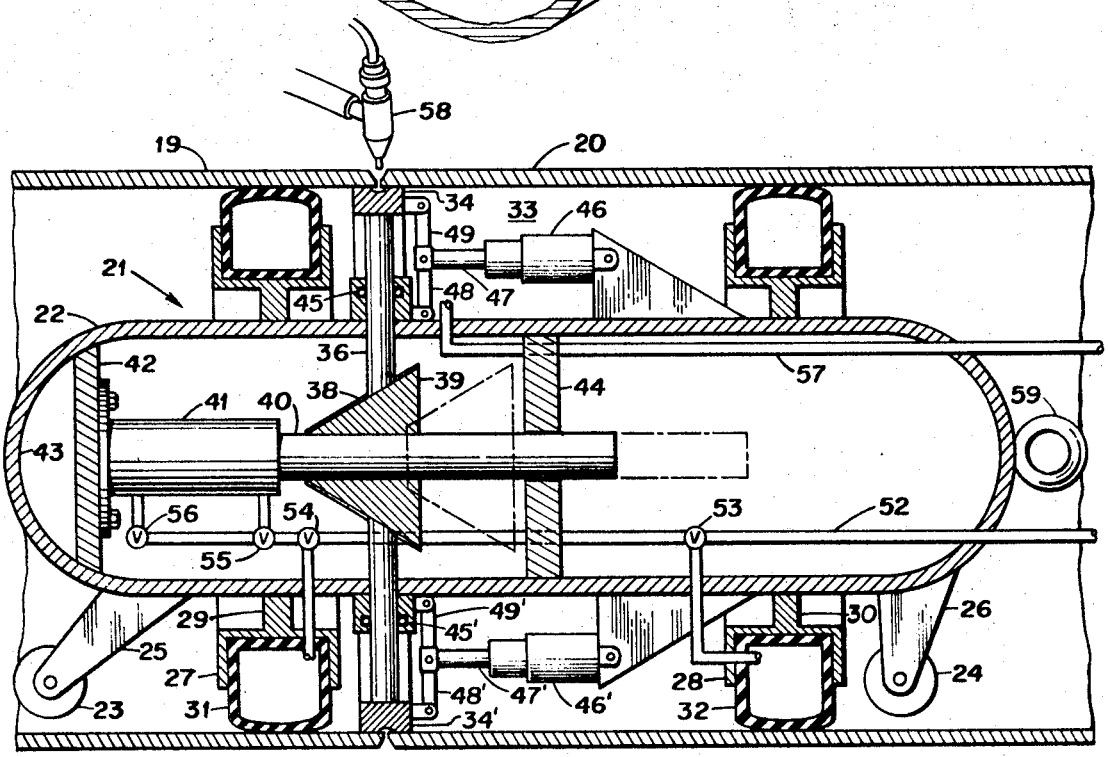
FIG. 2 is a cross-sectional view of one embodiment of an apparatus for carrying out the present invention and depicting a clamp member within abutting pipe sections.

A further embodiment of apparatus for carrying out the method of the present invention is depicted in cross-section in FIG. 2. Sections 19 and 20 of abutting pipes to be joined are depicted in horizontal axial alignment. A movable clamp member, indicated generally at 21, is disposed inside the pipeline and adjacent the abutting pipe ends 19 and 20. Clamp 21 includes an elongated tank 22 (preferably circular in cross-section) rollably mounted on wheels 23 and 24 secured to legs 25 and 26, respectively, attached to the tank. Exteriorly of the tank, there are provided two annular rims 27 and 28, U-shaped in cross-section joined to circumferential flanges 29 and 30, respectively, extending from tank 22. These rims are spaced apart on the tank preferably one being near either end of the elongated tank. A resilient inflatable tube 31 and 32 is fitted into each rim. The diametral dimensions of the tank, flange, rim and tube are such that each tube, when inflated, will sealably engage the internal circumference of one of the pipe sections. With both tubes inflated, an annular gas-tight region 33 is established, this annular region being defined on its ends by the tubes and on its sides by the wall of the tank and the pipe sections 19 and 20.

Figure 3:
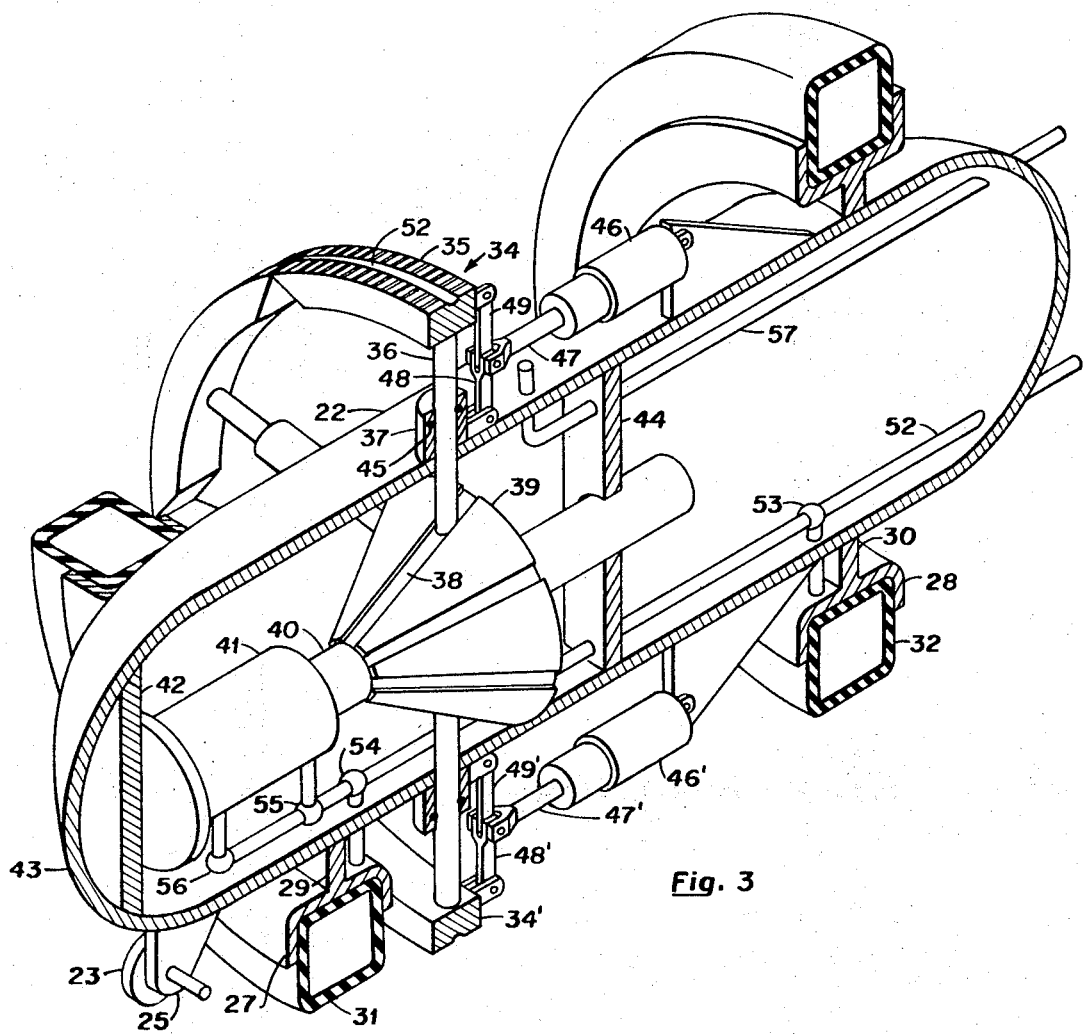
FIG. 3 is a perspective view of the clamp member of FIG. 2.

A multiplicity of radially disposed dam members 34 and 34' are associated with tank 22 at a location intermediate of the spaced-apart rims 29 and 30. Each dam member 34 (see FIGS. 3, 4, and 5) comprises an arcuate shoe 35 fixedly secured to a shaft 36 oriented radially with respect to tank 22 and reciprocably mounted in a tubular collar 37 extending outwardly from the exterior wall of the tank. Each shaft 36 extends from its accompanying shoe, through the collar and through the tank wall into the interior of the tank to slidably engage the cam surface 38 of a spreader 39 reciprocated along the longitudinal axis of tank 22 by the reciprocating shaft 40 of an air cylinder 41 mounted on a plate 42 welded in the end 43 of tank 22. As necessary, shaft 40 is supported at its free end by an appropriate spider element 44. Further each shaft is sealed against gas flow between the shaft and its annular collar by an O-ring 45 and 45' (typical).

Radial movement of each shoe is accomplished by two independent, but cooperating means whose function will be discussed hereinafter. For present purposes it is noted that movement of spreader 39 to the left in FIG. 2 forces all the shafts engaging the cam surface 38 to be forced uniformly radially outward. Additionally, and independently, each shoe can be moved radially by air cylinder 46 (typical) whose shaft 47 (typical) is fitted with linkage elements 48 and 49 (typical), one of which is attached to shoe 35, and the other of which is attached to tank 22, the two having their "free" ends pivotally attached to shaft 47. For clarity, the conventional air lines to these cylinders 46 and 46' (typical) are omitted from the figure.

Figure 4:
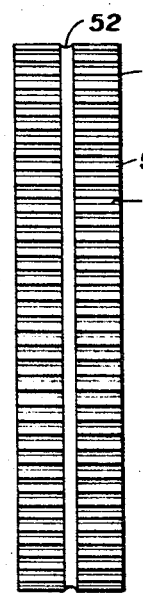
FIG. 4 is an end view of a typical shoe member of the clamp member of FIGS. 2 and 3 and depicts the slots therein through which gas flow occurs.
Figure 5:
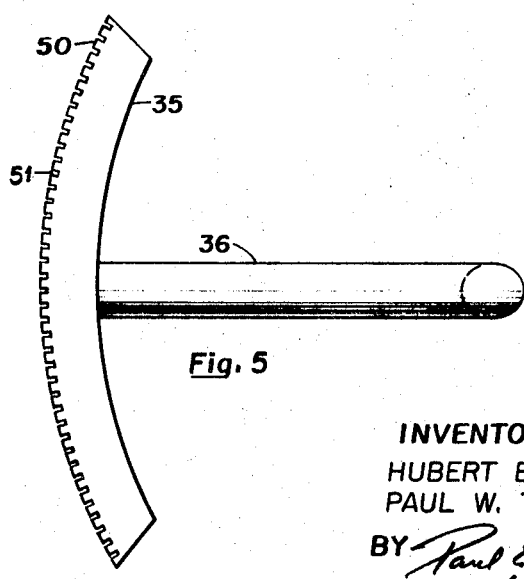
FIG. 5 is a side view of the shoe member of FIG. 4.

The construction detail of each shoe is depicted in FIGS. 4 and 5. Preferably each shoe comprises an arcuate body portion 35 centrally secured to a radially extending shaft 36 as hereinbefore described. The most radially outward surface 50 of each shoe is traversed laterally by a multiplicity of slots 51 through which gas can flow. Each shoe is also provided with a centrally longitudinal slot 52 which intersects the transverse slots 51. Thus, gas flowing through the longitudinal slot 52 passes to and through the lateral slots.

Referring again to FIG. 2, each tube 31 and 32 is connected to an air line 52. The air flow for inflating or deflating each tube is controlled by appropriate valve means 53 and 54. This same air line supplies the driving force for reciprocation of shaft 40 of air cylinder 41, control thereof being provided through valves 55 and 56. The line 52 leads out of the pipeline to any suitable source of air pressure and control system set up outside the pipeline.

Similarly, line 57 is led from a suction pump (not shown) outside the pipeline into annular region 33.

As depicted in FIG. 2, when tubes 31 and 32 are inflated and the dam members 34 (typical) are extended into contact with the joint region of the abutting pipe ends, the sections are positioned, automatically, for welding thereof. The welder commences the welding operation by causing shielding gas to flow from torch 58. The suction pump connected to line 57 is turned on to develop a negative pressure within annular region 33 thereby causing the shielding gas to flow from the area of the torch, between the abutting pipeline ends, thence through the slots in the shoes, and into annular region 33 to be withdrawn therefrom through the line 57. This gas flow pattern is maintained throughout at least the first pass along the joint.

Upon completion of a weld, air cylinder 41 is actuated to move spreader 39 to the right in FIG. 2 (position shown in phantom), to release the radial force tending to move the shoes outwardly. Thereupon, air cylinder 46 (typical) is actuated to withdraw its shaft 47 and, operating through linkage 48 and 49, to move shoe 34 grossly radially inward. By design, alternate shoes are moved greater radial distances to provide clearance for movement of the remaining shoes. Tubes 31 and 32 are deflated simultaneously. With the tubes deflated and shoes withdrawn, the wheels of the tank 22 settle into contact with the pipeline and the clamp is pulled into the next joint position. An eye bolt 59 in the end of the tank serves to receive a line by means of which the tank is pulled.

As a consequence of the inventors' dynamic negative-pressure concept, and in addition to the amenability of their invention to field welding, an improved weld and weld bead are obtained. Welds made with the apparatus of this invention are fully and uniformly fused throughout the cross-section of the joint. Tension tests show the welds to possess greater strength than the parent metal. Photomicrographs of cross-sectioned welds show the welds obtained by the present method to be fully fused and free of occlusions.

Inasmuch as the negative pressure within annular region 33 "pulls" molten weld metal into and completely fills the space defined by the dam and abutting pipeline ends, each joint has a weld bead of a mechanically determined contour and size. From joint to joint the beads are identical. The dam, with its longitudinal slot controls the size of each bead. Further, the "pull" on the molten weld metal ensures complete penetration while the dam controls against loss of weld metal due to excessive penetration. Thus as an additional advantage, the present invention precludes the formation of "icicles" and like deleterious weld defects.

Welds made in accordance with the present invention consistently pass the standard ASME Guided Bend Test Q-8 and QN-8, and Reduced-Section Tension Tests Q-6(a) and QN-6(a), Section IX—Welding Qualifications.

We claim:
1. An improved method for joining the abutting surfaces of adjacent materials having front and back sides comprising,
  (a) butting together the surfaces to be joined,
  (b) positioning a dam member on the back side of said materials in juxtaposition to at least a portion of said abutting surfaces, said dam and said abutting surfaces defining a space to be filled with weld metal, said dam including gas flow passageways,
  (c) establishing, by means of flowing gas, a pressure within said defined space, said pressure being less than the ambient pressure on the front side of said materials, whereby gas is moved from the front side of said materials, between said abutting surfaces and through said passageways of said dam member,
  (d) filling at least a portion of said defined space with weld metal and
  (e) removing said dam member subsequent to solidification of said weld metal.
2. The improved method of claim 1 wherein said dam member is coextensive in length with the abutting surfaces.

3. The improved method of claim 1 wherein said dam member comprises an elongated strip having a centrally disposed longitudinal contoured groove on the side thereof adjacent said abutting surfaces, and a multiplicity of gas passageways extending laterally from said longitudinal groove to provide gas passageways from said groove to the side of said strip.

4. In fusion welding of adjacent ends of pipe wherein fusion is effected by means of a torch disposed exteriorly of said pipe ends, the improvement comprising the steps of
  (a) inserting an expandable clamp member interiorly of said pipe and contiguously of said pipe ends,
  (b) expanding said clamp into contact with either of said pipe ends interiorly thereof wherein a portion of said expanded clamp forms a gas-permeable dam on the radially inward side of at least a portion of said adjacent pipe ends,
  (c) establishing a predetermined flow of gas from the exterior to the interior of said pipe, wherein said gas passes from the exterior of said pipe, thence between at least a portion of said adjacent pipe ends, thence through the passageways of said gas-permeable dam member, thence to the interior of said pipe,
  (d) maintaining said flow of gas throughout at least a major portion of the time during which the first welding pass along said adjacent pipe ends is being made, and,
  (e) removing said clamp.

5. The improvement of claim 4 wherein a further portion of said expanded clamp forms an annular region extending longitudinally across said adjacent pipe ends and encompassing said dam member within the confines of said annular region.

References Cited

UNITED STATES PATENTS

| | | | |
|---|---|---|---|
| 3,095,844 | 7/1963 | Thielsch | 29—494X |
| 3,229,884 | 1/1966 | Franklin et al. | 228—50 |
| 3,338,499 | 8/1967 | Gilbert | 29—494X |
| 3,458,105 | 7/1969 | Valentine | 228—50X |

FOREIGN PATENTS

| | | | |
|---|---|---|---|
| 585,977 | 3/1947 | Great Britain | 228—50 |

JOHN F. CAMPBELL, Primary Examiner

R. J. SHORE, Assistant Examiner

U.S. Cl. X.R.

29—494; 228—50